US008806619B2

(12) United States Patent
Lomont et al.

(10) Patent No.: US 8,806,619 B2
(45) Date of Patent: Aug. 12, 2014

(54) SYSTEM AND METHODS FOR DETECTING SOFTWARE VULNERABILITIES AND MALICIOUS CODE

(75) Inventors: Chris C. Lomont, Ann Arbor, MI (US); Charles J. Jacobus, Ann Arbor, MI (US)

(73) Assignee: Cybernet Systems Corporation, Ann Arbor, MI (US)

( * ) Notice: Subject to any disclaimer, the term of this patent is extended or adjusted under 35 U.S.C. 154(b) by 825 days.

(21) Appl. No.: 12/338,523

(22) Filed: Dec. 18, 2008

(65) Prior Publication Data

US 2009/0165135 A1    Jun. 25, 2009

Related U.S. Application Data

(60) Provisional application No. 61/015,462, filed on Dec. 20, 2007.

(51) Int. Cl.
*G06F 12/14* (2006.01)
*G06F 11/00* (2006.01)
*G06F 12/16* (2006.01)
*G08B 23/00* (2006.01)

(52) U.S. Cl.
USPC .............................. 726/22; 726/24; 713/164

(58) Field of Classification Search
None
See application file for complete search history.

(56) References Cited

U.S. PATENT DOCUMENTS

| 5,826,013 | A * | 10/1998 | Nachenberg | 726/22 |
|---|---|---|---|---|
| 6,357,008 | B1 * | 3/2002 | Nachenberg | 726/24 |
| 7,779,472 | B1 * | 8/2010 | Lou | 726/24 |
| 7,809,670 | B2 * | 10/2010 | Lee et al. | 706/59 |
| 2004/0019832 | A1 * | 1/2004 | Arnold et al. | 714/38 |
| 2004/0158732 | A1 * | 8/2004 | Kissel | 713/200 |
| 2004/0181687 | A1 * | 9/2004 | Nachenberg et al. | 713/201 |
| 2007/0294768 | A1 * | 12/2007 | Moskovitch et al. | 726/24 |
| 2008/0016339 | A1 * | 1/2008 | Shukla | 713/164 |
| 2008/0127346 | A1 * | 5/2008 | Oh et al. | 726/23 |
| 2010/0043072 | A1 * | 2/2010 | Rothwell | 726/24 |

* cited by examiner

*Primary Examiner* — Shin-Hon Chen
(74) *Attorney, Agent, or Firm* — Gifford, Krass, Sprinkle, Anderson & Citkowski, P.C.

(57) ABSTRACT

A system and method determines whether software includes malicious code. A validation machine is instrumented with tools and monitors that capture the static and dynamic behavior of software. Software under examination is executed on the validation machine, and the tools and monitors are used to log data representative of the behavior of the software to detect vulnerable or malicious code. If possible, one or more operations are automatically performed on the software to enhance the security of the software by neutralizing the vulnerable or malicious code. Activities that cannot be neutralized automatically are flagged for human inspection. The software executed on the validation machine may be source code or non-source code, with different operations being disclosed and described in each case.

28 Claims, No Drawings

SYSTEM AND METHODS FOR DETECTING SOFTWARE VULNERABILITIES AND MALICIOUS CODE

GOVERNMENT SUPPORT

This invention was made with Government support under Contract No. W911QX-06-C-0107 awarded by the United States Army. The Government has certain rights in the invention.

REFERENCE TO RELATED APPLICATION

This application claims priority from U.S. Patent Application Ser. No. 61/015,462, filed Dec. 20, 2007, the entire content of which is incorporated herein by reference.

FIELD OF THE INVENTION

This invention relates generally to computer systems and, in particular, to the instrumentation of a validation machine that gathers information about software and feeds this data into a learning or knowledge system operative to analyze different aspects of the software statically and dynamically and rates the program as safe or unsafe with some probability.

BACKGROUND OF THE INVENTION

Verifying that software does not contain backdoors, vulnerabilities, or other unintended or malicious behavior is a very difficult task. Although no method can automatically detect all possible problems, the goal is to automatically analyze software behavior by a machine, with suspicious sections being passed on to a human for further inspection.

SUMMARY OF THE INVENTION

This invention resides in a system and method of determining whether software includes malicious code. The method includes instrumenting a validation machine with tools and monitors that capture the static and dynamic behavior of software. Software under examination is executed on the validation machine, and the tools and monitors are used to log data representative of the behavior of the software to detect vulnerable or malicious code. If possible, one or more operations are automatically performed on the software to enhance the security of the software by neutralizing the vulnerable or malicious code. Activities that cannot be neutralized automatically are flagged for human inspection.

The method may include the step of training the validation machine to automatically neutralize vulnerable or malicious code using knowledge gained through the human inspection. The method may include the step of installing drivers to monitor resources of interest by hooking into system calls. The method may further include the step of logging data representative of mouse, keyboard or other user inputs to determine if the software is performing suspicious operations with no associated user input.

A firewall may be used to monitor network access, and/or internal operating system instrumentation (i.e., APIs) may be used to monitor and log activities of interest. A library of known trusted programs or malicious programs may be stored, with the method including the step of comparing the software to the stored programs to detect vulnerable or malicious code. Data mining techniques may also be used to find patterns indicative of malicious code. The machine may be interfaced to an unprotected network monitor hacker activities. A Bayesian network may be trained to recognize patterns between the logs to classify the behavior as likely safe or likely unsafe.

The software executed on the validation machine may be source code or non-source code, with different operations being disclosed and described in each case.

DETAILED DESCRIPTION OF THE INVENTION

According to this invention, we converted a Windows PC platform into an instrumented system for detecting malicious code. We labeled this platform the "validation machine." The techniques generalize to other systems; however, including handheld devices such Palm Pilots, Blackberries, and cell phones or embedded devices like car computers and embedded systems. However, for proof of concept and wide applicability, we have chosen to illustrate the techniques using a PC.

We broadly gather information about software code in question from as many angles as possible, and to feed this data into some form of learning or knowledge system, which rates the program as safe/unsafe with some probability. To do this we create "monitors" which analyze different aspects of the program statically and dynamically. Some of these monitoring categories include:

Monitors Requiring Source Code

Poorly written source code is a sign of potential vulnerabilities, so when source is available, we analyze it with commercial and custom tools to gather information to feed the analysis engine. Some of these include:

1. Using code analysis tools like PC-LINT, LINTPlus, Purify, Coverity, and others to identify troublesome areas and problems with the code. However, these tools also report noise and often miss vulnerabilities put in purposely by a malicious author. More sophisticated techniques attempt to verify completely the security of the code, which in its entirety is proven impossible. Ideally, all available source code is run through a tool that is designed to spot security errors.

2. Newer, safer libraries (libs) can be linked to the applications, improving security. Overflow bugs are sometimes found and posted online in common libs like zlib, libPNG, and libJPEG[1]. Without access to source code it is nearly impossible to fix exploits and prevent them in applications linked to other libraries. Microsoft is constantly updating its standard C libraries, making newer versions more secure than previous ones, and also offers advice on which old functions to avoid for security reasons.

[1] Libjpeg is a commonly used open source library for reading/writing PEG images. libPNG is for PNG images. Zlib is for compression. All three are commonly used, so an exploit found in one affects many products.

3. Recompile the code with a newer compiler that has stack checking routines or technology in place.[2] GCC (a popular open source C/C++ compiler) and Microsoft are constantly adding security features to their compilers. For example, the basic buffer overflow shown above is no longer possible under code using either compiler, since there are "cookies" placed on the stack to prevent this. However, the security adds a few percent slowdowns. Microsoft's .NET platform has a lot of security features built in, so recompiling applications under .NET will add security for nearly free.

[2] Stack-smashing protection is used to detect the most common buffer overflows by checking that the stack has not been altered when a function returns. If it has been altered, the program exits with a segmentation fault. Two such systems are StackGuard and ProPolice, both of which are extensions to gcc. As of gcc-4.1-stage2, the ProPolice (which appears to have obsoleted StackGuard) patch seems to have been incorporated into the mainline distribution. Microsoft .NET has similar code guards in place, and some flavors of Linux and Unix are implementing such features in the OS. A stack smashing article is at http://www.phrack.org/phrack/49/P49-14.

4. Buffer checks—from compiler and dynamically, or by library or kernel updates.

5. Using source code, a program can auto generate tests of small functions to detect weak points. This is coupled with the static analysis from above, and uses the information at runtime to check what the code is doing versus what it should be doing.

Monitors when Source Code is not Available

Without source code, there are some things that can be done at runtime to make applications more secure and to detect suspicious behavior. Examples include:

1. Logging file, registry (on Windows), configuration changes, network access, and other resource usage is mandatory. This allows an administrator to view the logs and look for suspicious activity. This is one area in which we intend to improve automation.

2. Run in low-privilege modes and log access to items not allowed to the program. Never run a program above the privilege level needed to complete a task.

3. Use virus detection. Most virus protection systems employ simple pattern matching of known exploit code to system files. They are well tested and work well, but cannot catch future threats, and are not designed to catch possible exploits.

4. Rootkit detection. This is a new area on Windows, but one that is gaining ground. A rootkit installs itself and then hides by faking calls to system functions that look for bad files. Thus, once a rootkit is on a system, that system can never find the rootkit since the system now lies about itself.

5. Auto hack programs by feeding bad data. Windows DLLs and .NET assemblies have information about functions and parameters supported. Automated programs throwing bad and random calls to these functions will often expose system errors, and this is an easy thing to test. Any binary applications that can have bad data thrown in automatically should be tested in this manner since it is cheap to do.

6. Firewalls, inbound and outbound, should monitor network traffic and log activity. If anything is found to go bad, the logs can be examined (if they were not compromised).

A workable combination requires knowledge of the source code and the runtime data and compares the two. Examples include:

1. Buffer checking. The data can be compared form the known buffers in the source code and where they lie in memory, allowing a watcher process to monitor the program as it runs and report suspicious activity.

2. Memory checking applications, like BoundsChecker, that use code instrumentation during a compile to place information in the executable. This instrumentation is then used to catch resource leaks and errors.

3. Code coverage tools tell which sections of code have been executed. During development or testing complete code coverage should be obtained. If source has come from an outside vendor, obtaining complete code coverage while monitoring all activity provide a decent measure of the lack of any deliberately malicious code present. This, however, would not detect exploits.

4. Test based on auto tests generated from code. This is coupled with the source code item above.

Our invention uses a virtual[3] "validation machine" instrumented with various tools and monitors that capture static and dynamic behavior of software. Although all the types of monitors above can be added, for Phase I we only added a few for testing. The validation machine logs various forms of activity during normal use, catching and monitoring known exploit techniques, and flagging activity that is outside its understanding for human inspection. This human guidance trains the validation machine to detect vulnerable and malicious code using standard machine learning techniques.

[3] VMWare, www.vmware.com

In accordance with the invention, Windows is installed on a virtual machine. The virtual machine provides a rapid way to roll-back changes to a system, as well as to have before and after snapshots of a system for forensic comparison. Drivers are installed to monitor resources of interest by hooking into system calls. For Windows, the necessary drivers are available with source from www.sysinternals.com, and include the following:

DiskMon—monitor disk activity
FileMon—monitor file accesses
RegMon—monitor registry calls A newer process monitor from the same location gives an integrated program with the above three functions.

User activity, such as mouse and keyboard input, may optionally be logged as well. If the program is performing suspicious operations with no associated user input, this should be noted. Monitoring keyboard and mouse use will help determine this type of behavior. Other drivers may be developed or obtained on an as-needed basis.

A firewall such as ZoneAlarm (www.zonealarm.com) may be used to monitor network access, with the internal Windows instrumentation API being used to monitor and log other activities of interest. All of these applications either log their information, or could be modified with source to do so. The goal is to log all machine activity to a central location so we can analyze program behavior.

For programs for which we have source code, we ran source analysis tools (PC-LINT). We could instrument the code with monitoring tools like Bounds Checker (www.compuware.com) to further offer diagnostics and information on the code. GCC and the Microsoft C/C++ compiler ship with source code to the main libraries, so we can instrument those to monitor memory accesses and releases, calls to dangerous C Library functions, etc. Again, the idea is to gather as much logged data from the application as possible. This step will detect possible buffer overflows by code analysis.

While a program is running, we keep track (like a debugger or code coverage tool does) of which code has been executed and what the effects on the logs were. A kernel module may be used to carry this out this automatically. When new or untrusted code is run for the first time, if any suspicious activity is logged as well as where in the code the activity occurred.

For programs that do not have source available, we can obtain such coverage by dynamic disassembly, using tools like IDAPro (www.datarescue.com) to disassemble the code, determine where executable code was in memory, and then tag it as trusted or untrusted as it executes. In any case, we can link code in memory with activity in the log files.

We gathered a baseline corpus of known trusted programs and malicious programs. Trusted sources include open source applications, applications from trusted vendors, and programs we have written and vetted. Malicious programs can easily be found on the net by downloading known hacker software and tools, or perhaps from working with virus software vendors like Symantec (www.symantec.com). In either case, we should be able to find many programs of known trustability to train our software.

We ran programs and logged data for analysis. VMWare allows setting up multiple, independent, networked machines on one computer, and is ideal for testing like this. Each machine thinks it is the only machine, and so would behave as such, perhaps attacking other machines on its network. This is cost effective since it only requires one PC and no physical network. We gathered test data using this corpus of programs, with data mining techniques being used to find patterns indicative of malicious code.

The machine may be hooked to an unprotected network (a DSL line with no firewall, for example), to monitor what happens when external black hats try their skill on the machine. This too helps gather data for weak and malicious programs.

According to the invention, an algorithm may be trained to detect suspicious behavior, warn about possible weak source code, and attempt to trigger malicious behavior through sending bad data to an application. This will preferably be a Bayesian network, trained to notice patterns between the logs and then classify the behavior as likely safe or likely unsafe, much in the same way spam filters use patterns to classify email. Other approaches classifying the data, using data mining techniques, agent based systems, or whatever other types of learning and decision aid algorithms may also be applied this problem.

The end result is a standalone system, the validation machine, that can be started from baseline whenever desired with minimal work, which can be fed a program with or without source code, and that will use as many tools as have been added to verify program behavior, using adaptive methods to offer assistance on program safety. All information gained from the program will be accessible for humans to go over if desired, but the main benefit is automated, robust, and thorough analysis of all information available to test program behavior.

We claim:

1. A method of determining whether software includes malicious code, comprising the steps of:
   providing an actual, physical computer system to function as a validation machine;
   instrumenting the validation machine with tools and monitors to log data associated with the static and dynamic behavior of software executed on the validation machine;
   using human guidance to train an algorithm to automatically detect and learn patterns in the logged data associated with unsafe, vulnerable or malicious code using machine learning techniques;
   executing the algorithm on the validation machine to find patterns in the data logged during the execution of the software to classify the behavior of the software as likely safe or likely unsafe vulnerable or malicious code;
   if the software is classified as unsafe, vulnerable or malicious, automatically performing one or more operations on the software to neutralize the unsafe, vulnerable or malicious code; and
   flagging for human inspection activities that cannot be neutralized automatically.

2. The method of claim 1, including the step of training the validation machine to automatically neutralize vulnerable or malicious code using knowledge gained through the human inspection.

3. The method of claim 1, including the step of installing drivers to monitor resources of interest by hooking into system calls.

4. The method of claim 1, including the step of logging data representative of mouse, keyboard or other user inputs to determine if the software is performing suspicious operations with no associated user input.

5. The method of claim 1, including the step of using a firewall to monitor network access.

6. The method of claim 1, including the step of using internal operating system instrumentation to monitor and log activities of interest.

7. The method of claim 1, including the steps of:
   storing a library of known trusted programs or malicious programs; and
   comparing the software to the stored programs to detect vulnerable or malicious code.

8. The method of claim 1, including the step of using data mining techniques to find patterns indicative of malicious code.

9. The method of claim 1, including the steps of:
   interfacing the machine to an unprotected network; and
   monitoring hacker activities.

10. The method of claim 9, wherein the step of performing one or more operations on the software includes virus detection.

11. The method of claim 9, wherein the step of performing one or more operations on the software includes rootkit detection.

12. The method of claim 9, wherein the step of performing one or more operations on the software includes feeding bad data to auto hack programs.

13. The method of claim 9, wherein the step of performing one or more operations on the software includes monitoring network traffic and log activity with inbound or outbound firewalls.

14. The method of claim 1, including the step of training a Bayesian network to recognize patterns between the logs and classify the behavior as likely safe or likely unsafe.

15. The method of claim 1, wherein the software executed on the validation machine is source code.

16. The method of claim 15, wherein the tools and monitors include source-code analysis tools to detect buffer overflows.

17. The method of claim 15, wherein the step of performing one or more operations on the software includes analyzing the source code to determine whether the source code is poorly written.

18. The method of claim 8, wherein the step of performing one or more operations on the software includes running the source code through a software tool operative to spot security errors.

19. The method of claim 15, wherein the step of performing one or more operations on the software includes linking libraries (libs) to the software to enhance security.

20. The method of claim 15, wherein the step of performing one or more operations on the software includes recompiling the code with a compiler that has stack checking routines.

21. The method of claim 15, wherein the step of performing one or more operations on the software includes one or more buffer checks.

22. The method of claim 15, wherein the step of performing one or more operations on the software includes automatically generating tests of small functions to detect weak points.

23. The method of claim 1, wherein source code is not available for the software executed on the validation machine.

24. The method of claim 23, wherein the tools and monitors include dynamic disassembly tools to determine where executable code was in memory, and then tag it as trusted or untrusted as it executes.

25. The method of claim 23, wherein the step of performing one or more operations on the software includes logging file, registry, configuration changes, network access, and other resource usage.

26. The method of claim 23, wherein the step of performing one or more operations on the software includes running the code in low-privilege modes and logging access to items not allowed to the program.

27. The method of claim 1, wherein the validation machine is a virtual machine.

28. The method of claim 1, further including the step of rating the software as safe or unsafe with some probability.

* * * * *